United States Patent [19]

Carlsson

[11] 4,242,202
[45] Dec. 30, 1980

[54] APPARATUS FOR TAKING UP OIL FROM A WATER SURFACE

[75] Inventor: Knut G. Carlsson, Vadum, Denmark

[73] Assignee: A/S De Smithske, Nørresundby, Denmark

[21] Appl. No.: 57,032

[22] Filed: Jul. 12, 1979

[30] Foreign Application Priority Data

Aug. 14, 1978 [SE] Sweden ................. 7808596

[51] Int. Cl.³ ............................... E02B 15/04
[52] U.S. Cl. ........................ 210/242.3; 210/408; 210/923
[58] Field of Search ........... 210/242, 83, DIG. 25, 210/DIG. 26, 408

[56] References Cited

U.S. PATENT DOCUMENTS

| | | | |
|---|---|---|---|
| 3,358,838 | 12/1967 | Kosar et al. | 210/242 S |
| 3,536,199 | 10/1970 | Cornelius | 210/242 |
| 3,700,109 | 10/1972 | Lasko | 210/DIG. 25 |
| 3,702,297 | 11/1972 | Maksimi, Jr. | 210/DIG. 25 |
| 3,838,775 | 10/1974 | Larsson | 210/DIG. 25 |
| 3,907,684 | 9/1975 | Galiua | 210/242 |
| 4,021,344 | 5/1977 | Webb | 210/DIG. 25 |
| 4,151,081 | 4/1979 | Bolli | 210/242 S |

FOREIGN PATENT DOCUMENTS

| | | |
|---|---|---|
| 53185 | 5/1951 | United Kingdom . |
| 1288603 | 9/1972 | United Kingdom . |
| 1336478 | 11/1973 | United Kingdom . |
| 1353806 | 5/1974 | United Kingdom . |
| 1428818 | 3/1976 | United Kingdom . |
| 1433928 | 4/1976 | United Kingdom . |

*Primary Examiner*—Theodore A. Granger
*Attorney, Agent, or Firm*—Stevens, Davis, Miller & Mosher

[57] ABSTRACT

A floating body the buoyancy of which may be controlled comprises a tubular housing for a driven conveyor screw operating adjacent the lower portion of a funnel having its upper edge positioned in a layer of oilspills to be skimmed. Intermediate the funnel and a discharge opening with a hose connector the housing is provided with a laterally extending casing surrounding a freely rotatable restrainer and scraper disc having notches in its peripheral portion to be engaged by the screw threads.

4 Claims, 3 Drawing Figures

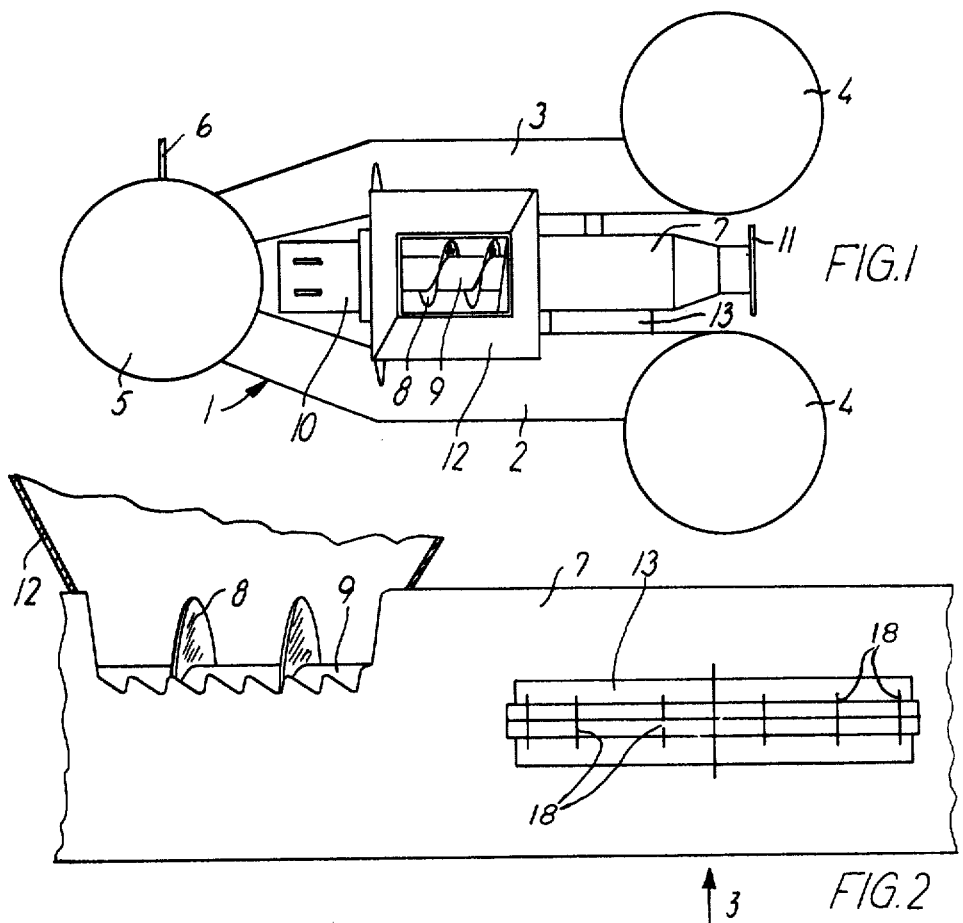
FIG.1
FIG.2
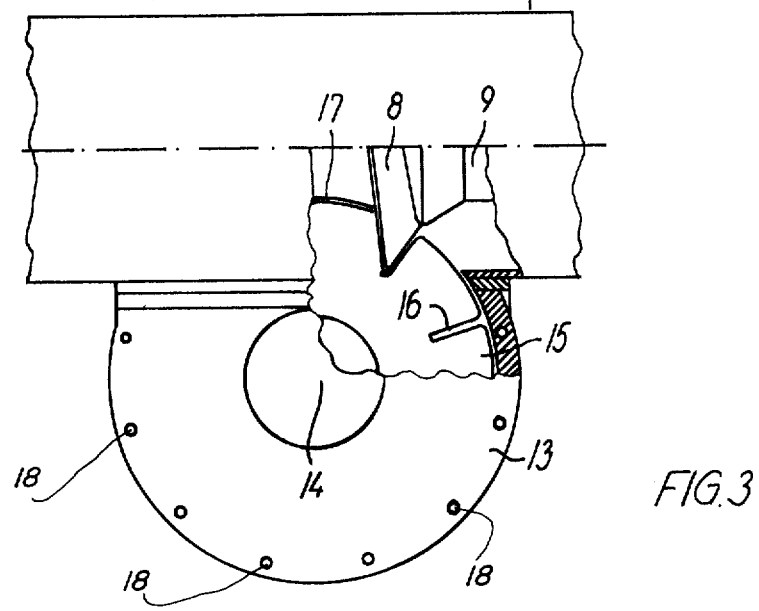
FIG.3

APPARATUS FOR TAKING UP OIL FROM A WATER SURFACE

For the purpose of skimming oilspills from a water surface, e.g. in harbours or on more open sea, different devices and methods have been developed, particularly during the last decade, which operate to first collect the oil in a layer of a suitable thickness, usually by means of a floating barrier or boom, and next to pump the oil away into a barge or tank from which it may be delivered to further treatment or destruction.

Under ideal conditions, these known methods may lead to a satisfactory result, but in practice it is almost inevitable that a considerable quantity of water is pumped away together with the oil so that a subsequent separation becomes necessary, and in many cases the operation is further impeded by plast wastes, bird carcasses and other coarse pollution of a similar nature that blocks up the pumping and may cause severe damage to the apparatus used. Still further, the high viscosity of the oil, particularly at low water temperatures, may complicate or even prevent the operation of the existing oil skimmers.

An aim of the present invention is to provide an oilspill skimming apparatus that largely overcomes these difficulties so as to be useful even under conditions which cannot be managed by the known devices for the same purpose.

The apparatus of the invention is of the known type incorporating a floating body comprising a suction funnel, the upper edge of which is vertically adjustable by variation of the buoyancy of the body, and a pump device for removing the skimmed oil from the lower region of the funnel. The invention differs from prior art units of the same type in that the pump device consists of a conveyor screw having a driven shaft and extending from the lower region of the suction funnel towards a discharge aperture with a hose connector, the conveyor screw intermediate the funnel and the discharge aperture cooperating with a restrainer and scraper disc, the main plane of which is at least almost coincident with the axis of the conveyor screw, the periphery of disc being spaced only slightly from the shaft of the screw and having notches matching with the thread of the screw.

By the use of this apparatus it is attempted to collect the oilspills into a layer having a thickness of 10 to 15 cm, and by controlling the buoyancy of the floating body the upper edge of the funnel is positioned in the lower part of this layer which consists mainly of oil and possibly other pollution matter. The collection of the oil may go on continuously by means of a floating boom that is swept through the oil polluted area, and in such case the oil removing apparatus proper may be towed forwardly together with the boom, but while being used the apparatus may also be held stationary and the oilspills be caused to flow towards the apparatus.

The oil skimming or removing ability of the apparatus depends mainly on three factors. Firstly, the conveyor screw cooperating with the retainer and scraper disc can handle even extremely thick or high-viscous oil tending to adhere to the screw threads so as to simply rotate together therewith without being forced toward the discharge aperture. This tendency is counteracted by the disc which prevents the rotary motion of the oil mass and transforms it into a forwardly directed displacement. Secondly, the conveyor screw will produce a crushing effect on the mass passing through, especially at the transition from the funnel to the housing surrounding the remainder of the screw, so that even coarse and relatively hard foreign matter embedded in the oil will be broken or torn into pieces so as to be carried along by the conveyor screw without producing any blocking effect. Thirdly, the vertical position of the apparatus and possibly also its inclination may be constantly adjusted by controlling the buoyancy, dependent on the thickness of the oil layer, so that a maximum amount of oil and a minimum amount of water will pass over the upper edge of the funnel due to the pumping effect of the conveyor screw.

A fourth factor is also of considerable importance for the efficiency of the apparatus, viz. that the mass transported by the screw is subjected to a separating effect between the suction funnel and the restrainer and scraper disc. As a matter of fact, due to its lower viscosity water which in greater or smaller quantities flows down through the funnel together with the oil, will be forced radially outwards towards the wall of the housing and backwards towards the funnel so as to be discharged upwards through the funnel. As a result, a subsequent separation of water from the collected oilspills may become superfluous.

A preferred embodiment of the apparatus according to the invention will now be more fully described with reference to the drawing which is mainly diagrammatical and in which FIG. 1 is a plan view of this embodiment of the invention, FIG. 2 a side view, partially in section and to a greater scale than FIG. 1, with part of the tubular section removed to show part of the housing and the conveyor screw of the apparatus, and FIG. 3 a view perpendicular to that of FIG. 2, in the direction of arrow 3 in FIG. 2, showing the restrainer and scraper disc and the adjoining portion of the conveyor screw.

Referring now to FIG. 1, the apparatus comprises a body portion 1 having two parallel tubular sections 2 and 3 that may be filled with a suitable buoyant compound, e.g. an oil repellent plastics foam, and at their forward ends are connected to floats 4 which are supposed to be partially submerged below an oil polluted water surface. At their stern end both side sections 2 and 3 are connected to a common float 5 having a hose connection 6 for the supply and discharge of a gas serving to control the buoyancy of this float.

Between the side sections 2 and 3 a tubular housing 7 is mounted which encloses a conveyor screw 8 with a shaft 9 that can be rotated by means of a hydraulic motor 10 placed at the stern portion of the housing. At its opposite, or forward, end the housing forms a discharge aperture with a flange 11 or another coupling part to which a hose, not shown, may be connected. An opening in the upper wall of the housing 7 is surrounded by a funnel 12 firmly secured to the housing and having an upper edge portion which during the operation of the apparatus can be adjusted to a suitable level in the layer of oilspills to be skimmed so that oil together with any foreign solids and some water flow down to the conveyor screw 8 and are forced towards the flanged end 11. As shown, the edge portion defining the opening in the upper wall of the housing may be partially serrated so that, in cooperation with the screw threads, it efficiently cuts through any more or less solid matter.

Intermediate the funnel 12 and the flange 11 and housing 7 is provided with a laterally projecting casing 13, see particularly FIGS. 2 and 3, which in the embodiment shown extends into the side section 2 and is held together by bolts 18. A circular restrainer and scraper disc 15 journalled on a central pin 14 in the casing 13 has radially directed notches 16 in its outer peripheral edge portion. These notches 16 cooperate with the threads 8 of the conveyor screw for the purpose previously explained. As illustrated in FIG. 3, in order to improve the restraining effect of the disc 15 its periphery may almost coincide with a concave portion 17 of the shaft 9 of the conveyor screw.

I claim:

1. Apparatus for taking up oil from a water surface, incorporating a floating body comprising a suction funnel, the upper edge of which is vertically adjustable by variation of the buoyancy of the body, and a pumping device for removing the skimmed oil from the lower region of the funnel, said pumping device consisting of a conveyor screw having a driven shaft and extending from the lower region of the suction funnel towards a discharge aperture with a hose connector, the conveyor screw intermediate the funnel and the discharge aperture cooperating with a restrainer and scraper disc, the main plane of which is at least almost coincident with the axis of the conveyor screw, the periphery of the disc being spaced only slightly from the shaft of the screw and having notches matching with the thread of the screw.

2. Apparatus as claimed in claim 1, wherein the floating body comprises at least one float with means for controlling its buoyancy by variation of its gas filling.

3. An apparatus for taking oil from a water surface comprising:

a floatable body having means to adjust the buoyancy thereof;

a pumping device carried by said body comprising a generally horizontally extending elongated housing having a conveyor screw of generally uniform pitch mounted for rotation within the housing;

said housing having an upwardly facing suction funnel at its upstream end and a discharge opening at its downstream end;

a circular restrainer and scraper disc on said housing between said ends, said disc being mounted for free rotation about an axis generally perpendicular to conveyor screw axis and spaced from the conveyor screw by a distance slightly greater than the radius of the disc so as to define a clearance fit between the periphery of the disc and the central shaft of the screw;

said disc having a plurality of notches circumferentially spaced around its periphery, said notches being spaced and shaped so as to interfit with the threads of the screw and fill the space between two adjacent threads to scrape off material accumulated thereon.

4. The apparatus of claim 3 in which the restrainer and scraper disc is generally flat and planer.

* * * * *